(12) United States Patent
Summerfelt et al.

(10) Patent No.: US 11,320,453 B2
(45) Date of Patent: May 3, 2022

(54) AGING COMPENSATION OF A FERROELECTRIC PIEZOELECTRIC SHOCK SENSOR

(71) Applicant: TEXAS INSTRUMENTS INCORPORATED, Dallas, TX (US)

(72) Inventors: Scott Robert Summerfelt, Garland, TX (US); Benjamin Stassen Cook, Addison, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/856,488

(22) Filed: Apr. 23, 2020

(65) Prior Publication Data

US 2021/0199688 A1    Jul. 1, 2021

Related U.S. Application Data

(60) Provisional application No. 62/955,238, filed on Dec. 30, 2019.

(51) Int. Cl.
*G01P 21/00* (2006.01)
*G01P 15/09* (2006.01)

(52) U.S. Cl.
CPC .............. *G01P 21/00* (2013.01); *G01P 15/09* (2013.01)

(58) Field of Classification Search
CPC ....... G01P 21/00; G01P 15/09; G01P 15/0922
USPC ........ 73/514.34, 1.08–1.15, 1.59–1.63, 1.37, 73/1.38, 862.473, 862.628, 862.68, 497
See application file for complete search history.

(56) References Cited

U.S. PATENT DOCUMENTS

| | | | |
|---|---|---|---|
| 5,128,581 A | * | 7/1992 | Nakayama .......... G01P 15/0907 310/329 |
| 2008/0085212 A1 | * | 4/2008 | Adams .................... G01N 25/00 422/50 |
| 2018/0085605 A1 | * | 3/2018 | Maharbiz ............. A61B 6/4258 |

* cited by examiner

*Primary Examiner* — Robert R Raevis
(74) *Attorney, Agent, or Firm* — Charles A. Brill; Frank D. Cimino

(57) ABSTRACT

A method includes measuring a first signal from a set of pyroelectric devices at a first temperature and measuring a second signal from a set of piezoelectric devices at a first acceleration. The method also includes measuring a third signal from the set of pyroelectric devices at a second temperature and measuring a fourth signal from the set of piezoelectric devices at a second acceleration. The method further includes adjusting a piezoelectric calibration using the first, second, third, and fourth signals.

19 Claims, 11 Drawing Sheets

AGING COMPENSATION OF A FERROELECTRIC PIEZOELECTRIC SHOCK SENSOR

REFERENCE TO RELATED APPLICATION

This application claims priority to U.S. Provisional Patent Application Ser. No. 62/955,238, filed Dec. 30, 2019 and incorporated herein by reference.

BACKGROUND

Vibration sensors have various uses and are implemented in the art in various fashions. Piezoelectric devices are sometimes referred to as PZT devices, referring to the lead zirconate titanate that is a commonly used piezoelectric ceramic material. Some piezoelectric sensors comprise a discrete piezoelectric sensor coupled to an analog front end (AFE) for signal conditioning. While such an approach may serve the function of providing an electrical signal responsive to a vibration or other force or environmental effect imposed on the piezoelectric sensor, such an approach has various drawbacks. Such drawbacks can include size or bulk, expense, and an undesirably large amount of power consumption necessary to bias the sensor-to-AFE interface within an operating window. In addition, discrete sensors may be preconditioned for polarity at the time of manufacture, but such polarity, and hence device accuracy, may degrade due to change in temperature, passage of time, and response to long term effects of the magnitudes of force applied to the device.

SUMMARY

In one example, a semiconductor die includes piezoelectric devices and pyroelectric devices. The die also includes a heater and a finite state machine (FSM) coupled to the piezoelectric devices, the pyroelectric devices, and the heater.

In another example, a method includes turning on a heater on a semiconductor die, measuring a first signal from a set of pyroelectric devices, and determining a scaling factor for an acceleration measurement.

In yet another example, a method includes measuring a first signal from a set of pyroelectric devices at a first temperature and measuring a second signal from a set of piezoelectric devices at a first acceleration. The method also includes measuring a third signal from the set of pyroelectric devices at a second temperature and measuring a fourth signal from the set of piezoelectric devices at a second acceleration. The method further includes adjusting a piezoelectric calibration using the first, second, third, and fourth signals.

BRIEF DESCRIPTION OF THE DRAWINGS

For a detailed description of various examples, reference will now be made to the accompanying drawings in which.

DETAILED DESCRIPTION

A piezoelectric material is a material that creates electrical charge when subjected to mechanical stress. Some piezoelectric materials are also ferroelectric meaning that they exhibit spontaneous electric polarization that is reversible by an electric field. Piezoelectric ferroelectric materials (also referred to in short as "ferroelectrics") can be used as acceleration sensors. As made, the polarization of the domains of the ferroelectric are generally oriented in random directions, which if used as such will result in a relatively small output signal when subject to acceleration. Before using a ferroelectric as an acceleration sensor, the ferroelectric domains are poled, which involves the application of a voltage across electrodes of the ferroelectric in an attempt to align a larger percentage of the domains in the same direction thereby resulting in a larger signal-to-noise ratio.

A ferroelectric acceleration sensor is calibrated (e.g., at the factory) and calibration values are programmed into the sensor and used in the field to generate a signal indicative of acceleration. From time-to-time, the sensor is poled to realign the domains. Temperature can affect which domains are realigned during poling. For example, over an extended period of time and at elevated temperature, poling can increase (relative to poling at lower temperatures) the number of domains that are realigned resulting in an increased sensitivity of the ferroelectric acceleration sensor. Short term poling followed by subjecting the sensor to elevated temperatures, can cause a decrease in the domains that are realigned and thus a decrease in sensor sensitivity. Changes in sensor sensitivity renders the initial calibration of the sensor obsolete and thus results in sensor signals that less accurately measure acceleration. The examples described herein are directed to the use of a pyroelectric material and a local heater to scale the calibration of the piezoelectric ferroelectric acceleration sensor.

Figure 1:
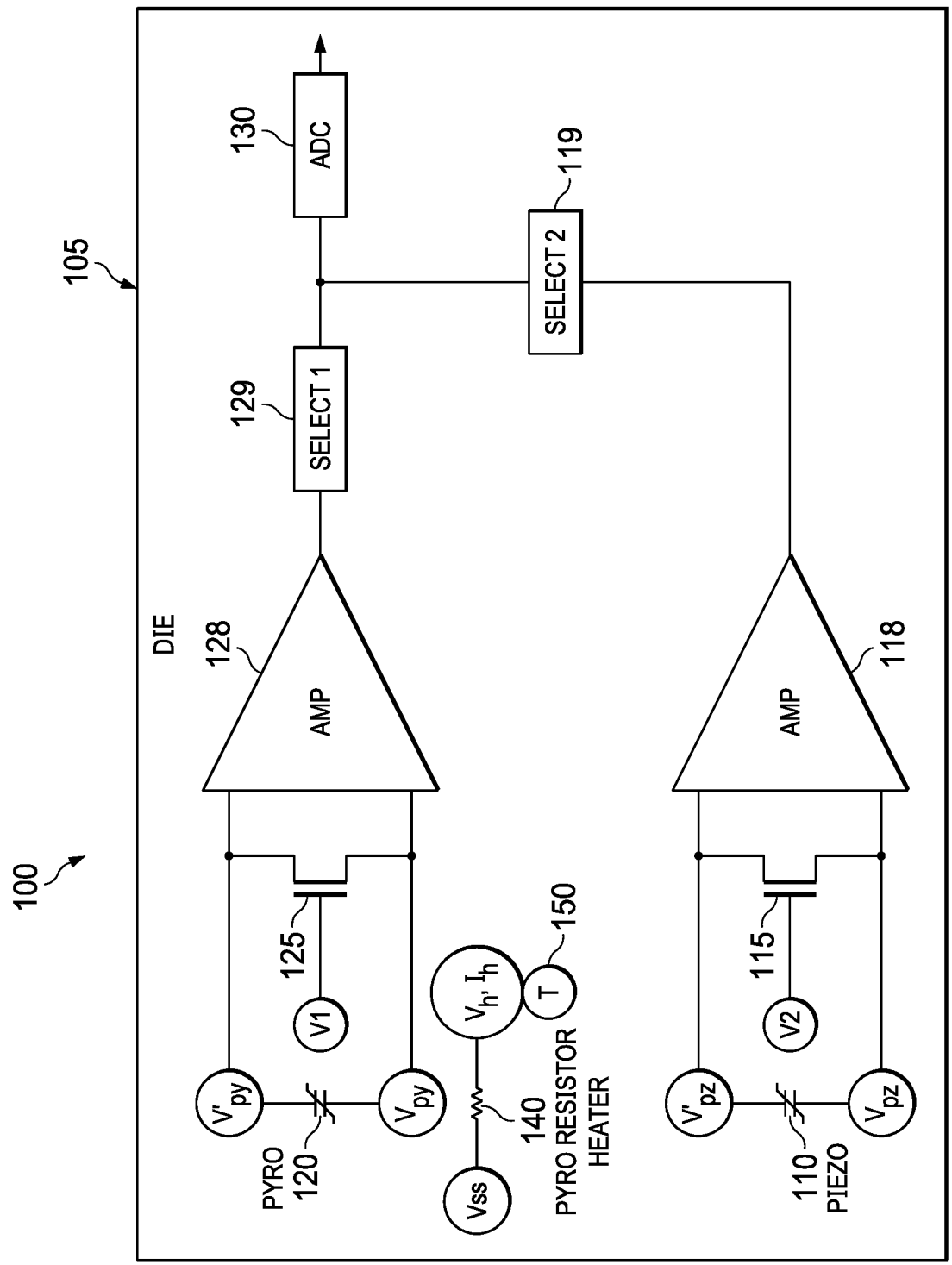
FIG. 1 illustrates an example of an acceleration sensor which includes a pyroelectric material.

FIG. 1 shows an example implementation of an acceleration sensor 100 comprising a semiconductor die 105 on which a piezoelectric 110 ("piezo") and a pyroelectric ("pyro") 120 are formed. In one example, the piezo 110 and pyro 120 comprise the same piezoelectric material that has both ferroelectric and pyroelectric properties. Pyroelectric material refers to a material that generates an electrical charge when heated. The piezo 110 is used to measure acceleration to which the die 105 is subjected, and the pyro 120 is used to determine a scale factor to account for drift in the piezo 110 as a result of temperature.

The described examples use the drift in the pyroelectric signal to track drift in the piezoelectric signal because both signals are based on the ferroelectric domain orientation. The piezoelectric sensor is fabricated on the same die as the pyroelectric sensor. The pyroelectric sensor 120 is provided with an in-situ, local pyro heater 140 that can be used to create known temperature changes to create pyro signals that can be used to infer changes in the domain orientation which correlate with changes in the piezoelectric signal. The local pyro heater 140 comprises a resistor-based heater (a pyro resistor heater) whose temperature increases with increasing voltage applied to the heater. The location of the pyro heater 140 is close enough to the pyro 120 to subject the pyro 120 to the heat generated by the pyro heater 140. A temperature sensor 150 is used to determine the temperature produced by the pyro heater 140.

In this example, the die 105 also includes amplifiers 118 and 128, selection circuits 119 and 129, and analog-to-digital converter (ADC) 130. While in the example of FIG. 1, a single ADC 130 is shared by both piezo 110 and pyro 120, in other examples, two separate ADCs can be provided with one ADC for the piezo signal and the other ADC for the pyro signal. Transistor 115 is used to bias the voltage from the piezo 110 to a predetermined voltage (e.g., 1V) prior to making an acceleration measurement. Similarly, transistor 125 is used to bias the voltage from the pyro 120 to a predetermined voltage (e.g., 1V) prior to using pyro 120 to make a measurement.

Figure 2:
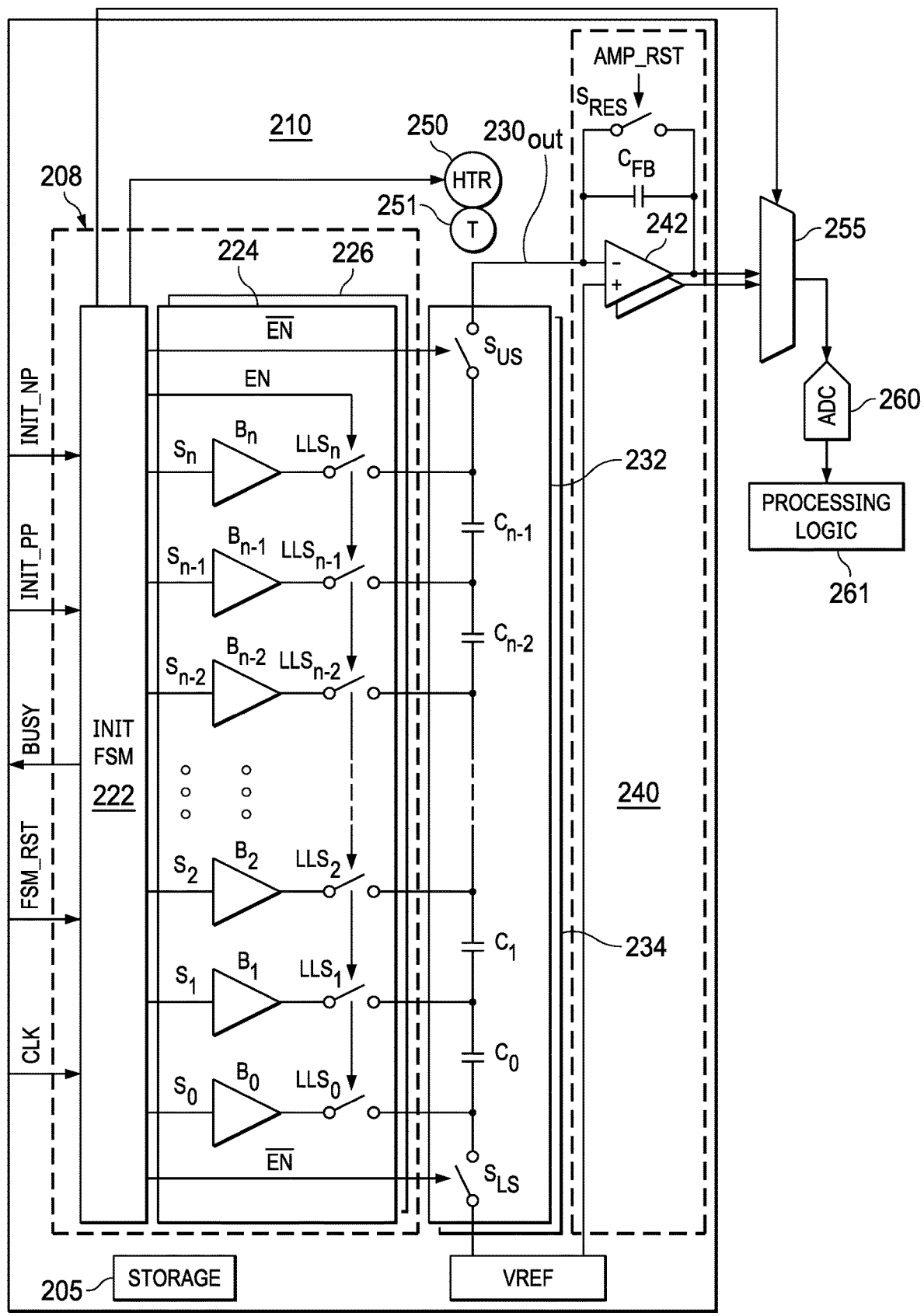
FIG. 2 illustrates a further example of the acceleration sensor of FIG. 1.

FIG. 2 further illustrates an implementation of the acceleration sensor 100 of FIG. 1 as sensor 210. In this example, sensor 210 includes a precondition circuit 208, piezo capacitor stack 232, pyro capacitor stack 234, a sensor output circuit 240, a multiplexer 255, an ADC 260, and processing logic 261. The piezo capacitor stack 232 represents piezo 110 in FIG. 1 and the pyro capacitor stack 234 represents pyro 120. Each capacitor element in each capacitor stack 232, 234 is referred as a "capacitive element" or a "capacitor" due to its capacitive behavior when connected to an electrical circuit. A pyro heater 250 is provided as well near the pyro capacitor stack 234.

Precondition circuit 208 includes an initialization finite state machine (INIT FSM) 222 in any suitable form, such as comprising logic gates, a controller, and the like. INIT FSM 222 achieves state transitions or sequential operations, as detailed later in connection with communicating n+1 poling signals $S_0$ through $S_n$ ultimately to the piezo capacitor stack 232 and the pyro capacitor stack 234. The processing logic 261 may be implemented within the INIT FSM 222 or as a separate logic circuit (e.g., microcontroller, discrete digital circuit, etc.).

In the example shown in FIG. 2, INIT FSM 222 receives four input signals, including a clock signal CLK, a reset signal FSM_RST, a negative polarization signal INIT_NP, and a positive polarization initialization signal INIT_PP. INIT FSM 222 also includes two sets of poling signals $S_0$ through $S_n$—one set usable to poll the piezo capacitor stack 232 and another set usable to pole the pyro capacitor stack 234. The precondition circuit 208 also includes buffer circuits 224 and 226. Each buffer circuit 224, 226 includes a set of buffers $B_0$ through $B_n$ and low leakage switch $LLS_0$ through $LLS_n$. The output signal from a given buffer $B_0$ through $B_n$ is coupled to a corresponding switch $LLS_0$ through $LLS_n$ as shown. The switches $LLS_0$ through $LLS_n$ of buffer circuit 224 are coupled to the piezo capacitor stack 232, and the switches $LLS_0$ through $LLS_n$ of buffer circuit 226 are coupled to the pyro capacitor stack 234. As such, one set of poling signals $S_0$ through $S_n$ is used to pole the piezo capacitor stack 232, and another set of poling signals $S_0$ through $S_n$ is used to pole the pyro capacitor stack 234. The INIT FSM 222 controls both sets of poling signals. For each capacitor stack 232, 234, INIT FSM 222 also outputs an enable signal EN (and its complement, $\overline{EN}$), as a switch control as detailed later. Further, INIT FSM 222 generates a BUSY output signal to that the INIT FSM 222 is in an active state (i.e., not in idle state).

Piezo capacitor stack 232 includes a number n of serially-connected capacitors, indicated $C_0$ through $C_{n-1}$, referred to as a stack to connote the serial connection between successive capacitors, that is, an upper electrode of capacitor $C_0$ is connected to a lower electrode of capacitor $C_1$, an upper electrode of capacitor $C_1$ is connected to a lower electrode of capacitor $C_2$, and so forth up through an upper electrode of capacitor $C_{n-2}$ being connected to a lower electrode of capacitor $C_{n-1}$. The value of n may be, for example, one or more, and in some instance is in the range of 3 to 64. For connecting poling signals and as described later, the number n of capacitors $C_x$ is one less than the number of buffers $B_x$ (and low leakage switches $LLS_x$). The pyro capacitor 234 is similarly configured.

Concluding the connectivity of each capacitor stack 232, 234, the lower electrode of capacitor $C_0$ is connected (in addition to switch $LLS_0$ described above) through a lower stack switch $S_{LS}$ to a reference voltage VREF. The upper electrode of capacitor $C_{n-1}$ is connected (in addition to switch $LLS_n$ described above) through an upper stack switch $S_{US}$ to an output $230_{out}$ to a corresponding amplifier 242. The stack switches $S_{LS}$ and $S_{US}$ of each capacitor stack 232, 234 are controlled by a corresponding $\overline{EN}$, that is, when $\overline{EN}$ is asserted, each such switch closes, and when $\overline{EN}$ is de-asserted, each such switch opens.

Sensor output circuit 240 includes a differential amplifier 242 for each capacitor stack 232, 234. The inverting input of each amplifier 242 is connected to the output $230_{out}$ of the corresponding capacitor stack 232, 234. The non-inverting input of each amplifier 242 is connected to VREF, which is connected to the lower electrode of capacitor $C_0$ in each capacitor stack. A feedback capacitor $C_{FB}$ is connected between the output and inverting input of each amplifier 242. The ratio between the sensor stack (232, 234) capacitance and capacitor $C_{FB}$ is essentially a capacitive voltage divider and determines the amplifier gain.

In addition, a reset switch, $S_{RES}$, is connected in parallel with each feedback capacitor $C_{FB}$, whereby each switch $S_{RES}$ is operable to close in response to a signal AMP_RST for purposes of defining a direct current (DC) bias point by asserting AMP_RST, initializing $230_{out}$, and then de-asserting AMP_RST after which alternating current (AC) voltage is properly divided as between $C_{FB}$ and the corresponding capacitor stack 232, 234. In this regard, therefore, switch $S_{RES}$ allows for compensating in that the amplifier 242 does not have resistive feedback, so any charge accumulation across capacitor $C_{FB}$ (due to leakage of any source) can cause the amplifier's output voltage to drift. Accordingly, AMP_RST can be asserted: (i) before sensing mode starts; (ii) periodically to mitigate drift; or (iii) when large $v_{out}$ offset is observed, where the last two scenarios also apply to temperature changes.

Multiplexer 255 is controlled by INIT FSM 222 to provide either the piezo signal from the amplifier 242 coupled to the piezo capacitor stack 232 or the pyro signal from the amplifier 242 coupled to the pyro capacitor stack 234 to the ADC 260. The ADC 260 converts the analog input signal to the ADC to a digital value and provides the digital value to the processing logic 261.

The sensor 210 also includes storage 205 (e.g., memory, registers, etc.). Calibration parameters defining, for example, polynomials can be stored in storage 205 and used to convert a piezo signal to an acceleration value.

Before production of sensor 210, engineering samples are evaluated to determine suitable calibration parameters. The calibration parameters may define a polynomial for the piezo capacitor stack 232 and another polynomial for the pyro capacitor stack 234. For each of one or more engineering samples, the temperature dependence of the pyro capacitor stack 234 on the power of the pyro heater 250 is determined. Each engineering sample may be placed in an oven and heated to each of multiple different temperatures (−40 degrees C., −30 degrees C., −20 degrees, etc.). At each temperature, the pyro heater 250 is turned on with a known voltage to create a change in temperature across the pyro capacitor stack 234. The output signal from pyro capacitor stack 234 (as amplified by amplifier 242 and converted to a digital code by ADC 260) is measured, and the signal from the temperature sensor 251 also is measured. As such, a set of pyro signals and temperature sensor signals are recorded for different temperatures and pyro heater voltages. From that data, a polynomial for the pyro capacitor 234 is computed (e.g., by the processing logic 261) to relate pyroelectric signal with temperature. The acceleration sensor 100 then periodically performs a calibration process to convert pyroelectric signal changes that have been temperature-normalized with ferroelectric domain changes. The same domain changes can then be used to calculate a new piezoelectric signal calibration by the acceleration sensor 100.

Further, at the same temperatures (−40 degrees C., −30 degrees C., −20 degrees, etc.), the piezo signal is measured for different known accelerations applied to the sensor 210. The piezo signals from ADC 260 are also recorded for each acceleration and each temperature. From that data, a polynomial for the piezo capacitor stack 232 is computed (e.g., by the processing logic 261) to relate piezo signal and temperature to acceleration. The resulting piezoelectric calibration curve allows for conversion of the piezoelectric signal to acceleration. The processing logic 261 may store the scaling factor (e.g., calibration curve) in storage 205.

Figure 3:
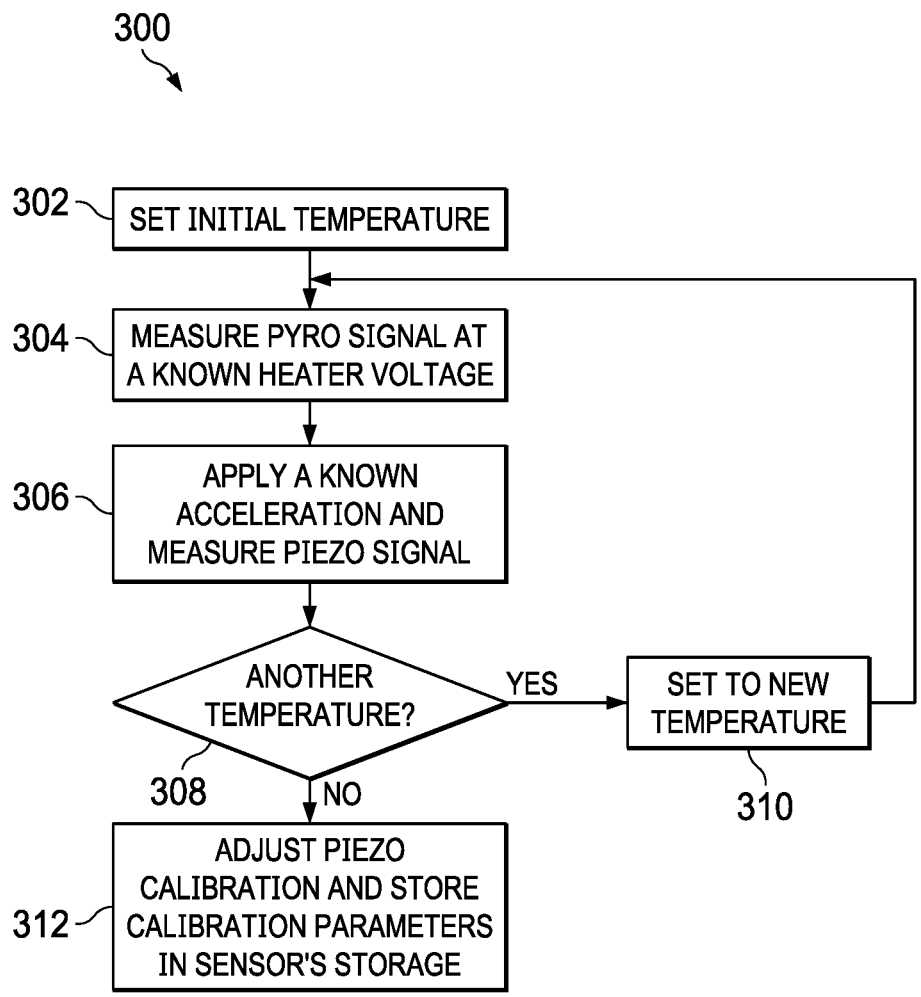
FIG. 3 is a flow chart of an example method associated with the acceleration sensor.

Each sensor 210 made can then be further evaluated to further customize its calibration. FIG. 3 shows an example method 300 to initially calibrate each sensor 210. The operations can be performed in the order shown, or in a different order. Method 300 may be performed before the sensor 210 is installed as part of a larger system, or otherwise used in the field.

At 302, method 300 includes setting an initial temperature for the sensor 210. The sensor can be placed in an oven and heated to a specified temperature (e.g., 30 degrees C.). At 304, the method includes measuring the pyro signal at a known heater voltage (e.g., at a known voltage applied to the pyro heater 250). At 306, the sensor 210 is subjected to a known acceleration and the piezo signal (from the piezo capacitor stack 232) is measured and recorded. If another temperature is to be used in the sensor-specific calibration method (as determined at 308), then the oven is set to the new temperature and operations 304 and 306 are repeated. More than two temperatures can be used during the process of FIG. 3. If no more temperatures are to be used, then at 312 the calibration for the piezo capacitor stack 232 determined above is adjusted based on the data obtained by method 300 and stored in storage 205 of the sensor 210.

Figure 4:
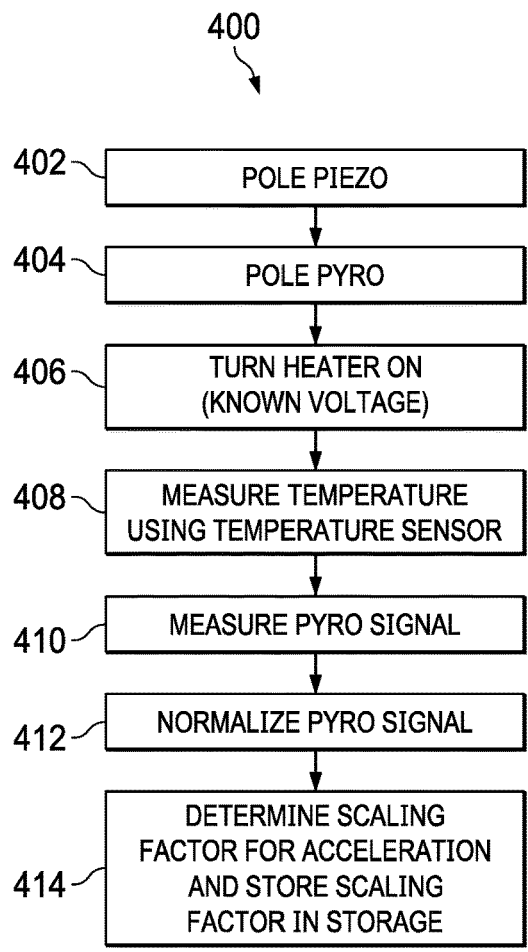
FIG. 4 shows a flow chart of an example method performed during the life of the acceleration sensor.

FIG. 4 shows an example of scaling the calibration of the piezo based on drift due to temperature affects. Method 400 of FIG. 4 can be performed periodically (e.g., once every day, week, month, etc.), whenever the sensor 210 is turned on, or other desired cadences. The INIT FSM 222 may implement the operations shown in FIG. 4. At 402 and 404, the piezo capacitor stack 232 and the pyro capacitor stack 234 are poled to orient the domains in the same direction. An example of how to pole the capacitor stacks is provided below.

At 406, the pyro heater 250 is turned on with a known voltage to heat the pyro capacitor stack 234. The temperature is measured using the temperature sensor 251 at 408. At 410, the pyro signal is measured and normalized at 412. At 414, a scaling factor is determined from the normalized pyro signal for the measured temperature. The scaling factor is stored in storage 205. When a piezo signal is measured and input into the piezo polynomial to be converted to an acceleration value, the scaling factor from storage 205 is used to modify the acceleration value.

As noted above, the piezo capacitor stack 232 and the pyro capacitor stack 234 are poled from time-to-time. FIGS. 5-9D illustrate a method 500 that may be used to pole either or both of the capacitor stacks 232, 234. The following discussion is presented in reference to poling one of the capacitor stacks, but the technique can be applied to both stacks. In general, when one capacitor stack is poled, the other capacitor stack also is poled.

Method 500 commences at 502, in which an index x is established so as to facilitate looping through a total of n+1 iterations of a sequence, as controlled in part by index x. Also, during this iteration, as established for example at 202, EN=1, thereby closing all of the low leakage switches $LLS_0$ through $LLS_n$, so that poling signals $S_0$ through $S_n$ are connected to respective nodes in capacitor stack 232, 234. Note that with EN=1, its complement is $\overline{EN}$=0, thereby opening switches $S_{US}$ and $S_{LS}$, and isolating capacitor stack 232, 234 from sensor output circuit 240.

Figure 6A:
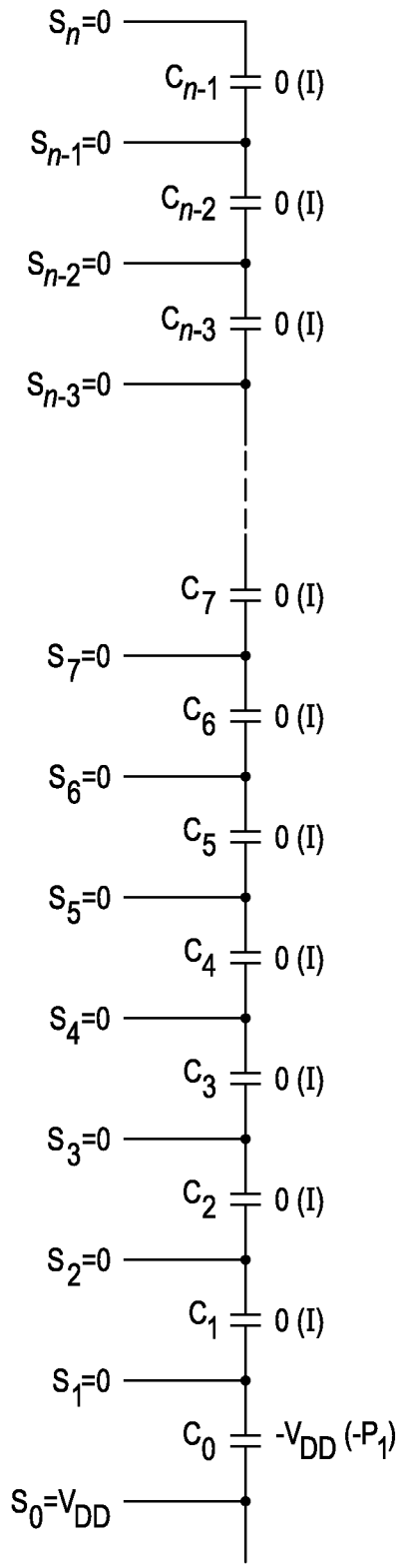
FIGS. 6A-6D illustrate a time sequence of poling actions corresponding to FIG. 5.

After initializing the index value, at 504 a first subset of poling signals $S_0$ through $S_n$, namely, $S_0$ to $S_x$, are set to $V_{DD}$, while a second subset of poling signals, namely, the remaining $S_{x+1}$ to $S_n$, are set to ground (shown as zero volts). By way of example, therefore, for the first iteration of operation 504 (i.e., x=0 from operation 202), then the first subset of signals has $S_0$=$V_{DD}$, while the second and remaining poling signals $S_1$ through $S_n$ all equal 0. To further illustrate this example, FIG. 6A illustrates a simplified and partial view of a capacitor stack, with the application of the first iteration of these signals as described. Thus, with $S_0$=$V_{DD}$ and $S_1$=0, note that the voltage across capacitor $C_0$ is −$V_{DD}$, as shown to the right of the capacitor in FIG. 6A. At the same time, however, with the remaining $S_{x+1}$ to $S_n$ equal to ground, then each of the other capacitors $C_1, \ldots, C_{n-1}$ has a voltage of 0 volts across it, as also shown to the right of each of those capacitors.

Figure 7:
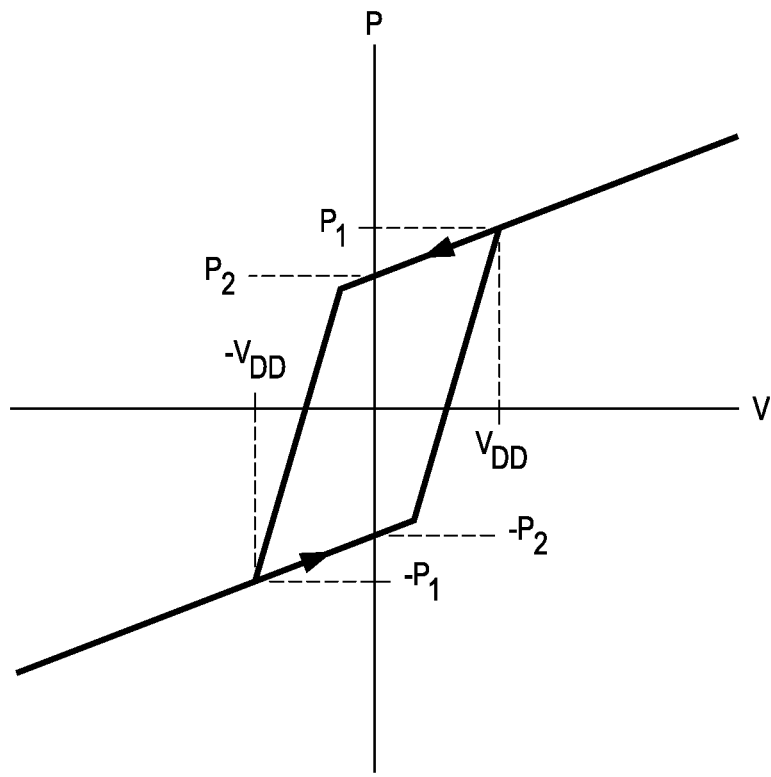
FIG. 7 illustrates the hysteresis associated with poling a ferroelectric material.

Additionally, in FIG. 6A, a parenthetical is shown to the right of the voltage across each capacitor. A ferroelectric material will polarize in response to energy (e.g., voltage) applied to it, and the general nature of the response curve demonstrating such polarization is shown by way of example in FIG. 7, which is not drawn to scale but generally depicts a hysteresis aspect. Specifically, FIG. 7 illustrates voltage (V) along its horizontal axis and material polarization (P) along its vertical axis. With hysteresis, however, the ferroelectric polarization at 0 volts depends on the direction of the voltage as it approached the 0 volt point, namely, for a voltage that was negative and increases toward 0 volts, then at 0 volts the ferroelectric polarization is at a level shown as $-P_2$, whereas for a voltage that was positive and decreases toward 0 volts, then at 0 volts the ferroelectric polarization is at a level shown as $P_2$. Note that FIG. 7 is drawn symmetrically for sake of simplifying the illustration, discussion, and understanding, so that $-P_2$ has the same magnitude as $P_2$. Due to the fabrication sequence, however, the absolute values of positive and negative polarization magnitudes may differ from each other when a capacitor is subjected to either $V_{DD}$ or $-V_{DD}$.

Referring back to FIG. 6A, therefore, for the first instance of operation 502 from method 500, the voltage across capacitor $C_0$ is $-V_{DD}$, so the polarization across that device is $-P_1$. Note for sake of reference that capacitors $C_1, \ldots C_{n-1}$, that is, that the capacitors above capacitor $C_0$ in stack 30, will not yet have been intentionally polarized in response to a voltage signal and therefore the parenthetical indication of "I" shown in FIG. 6A (and later figures) is intended to indicate an indeterminate state.

Figure 5:
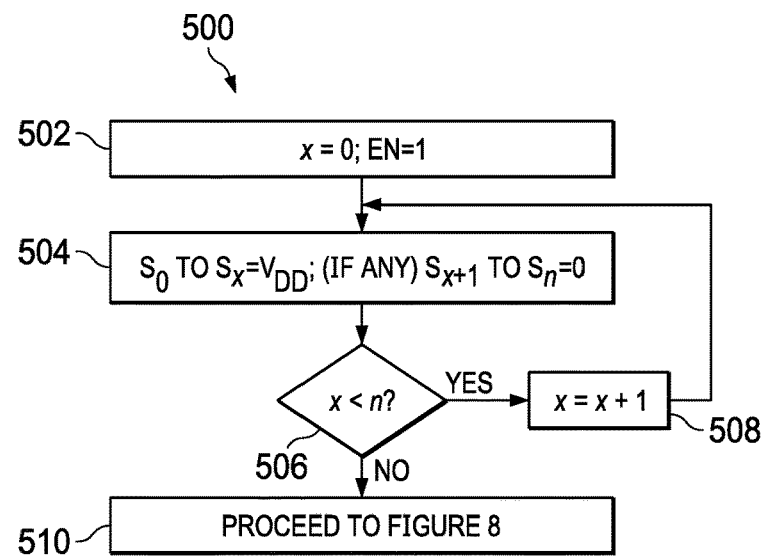
FIG. 5 shows an example of at least a portion of a method for poling the acceleration sensor.

At 506 in FIG. 5, the method includes comparing the loop index x to determine if it is less than (i.e., has not completed) all of the n+1 of poling signals $S_0$ through $S_n$. If the loop index x is less than n, then method 500 proceeds to step 508, which increments the loop index x and returns flow to 504. However, if the loop index x is no longer less than n, then method 500 proceeds to 510 to complete the method, which also as shown can then transition to method 800 of FIG. 8, detailed below.

Figure 6B:
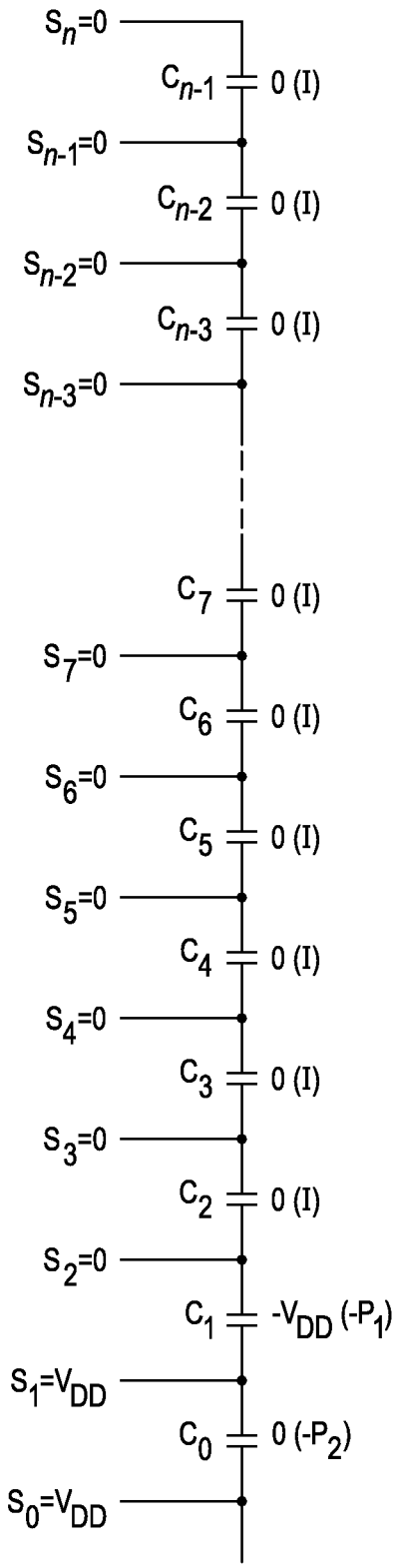

For each increase in loop index x in FIG. 5, then one at a time, from the bottom of stack 232, 234 upward, each successive capacitor $C_x$ will receive a voltage of ground at its upper electrode, with a voltage of $V_{DD}$ at its lower electrode, thereby causing the capacitor, in response to those respective voltages, to attain a polarization of $-P_1$. In addition, however, note now the additional operation once the loop index x equals one or more. Specifically, FIG. 6B illustrates the biasing signals and polarization of capacitor stack 232, 234 when the loop index x equals one. Per operation 504, therefore, the first subset of poling signals is $S_0$ through $S_1$ and equal $V_{DD}$, while the second subset of poling signals is $S_2$ through $S_n$, and equal zero volts. Again, therefore, the capacitor $C_x$, which for x equals 1, is $C_1$, receives ground at its upper electrode and $V_{DD}$ at its lower electrode, polarizing the capacitor at $-P_1$; note, however, the effect of the loop on the capacitor immediately below capacitor $C_x$ in the serial path, that is, at capacitor $C_{x-1}$, which in the current example is capacitor $C_0$. For that capacitor, both its upper and lower electrodes are now at $V_{DD}$, so the voltage across the capacitor, formerly at $-V_{DD}$ for the immediately preceding iteration of x=x-1, is now switched to 0 volts. According to the hysteresis response of FIG. 7, therefore, the polarization across the capacitor will recede in magnitude, but not change polarity, from $-P_1$ to $-P_2$. Hence, for the iteration of method 500 when x=1, the polarization of capacitor $C_0$ is $-P_2$, while the polarization of capacitor $C_1$ is $-P_1$.

Figure 6C:
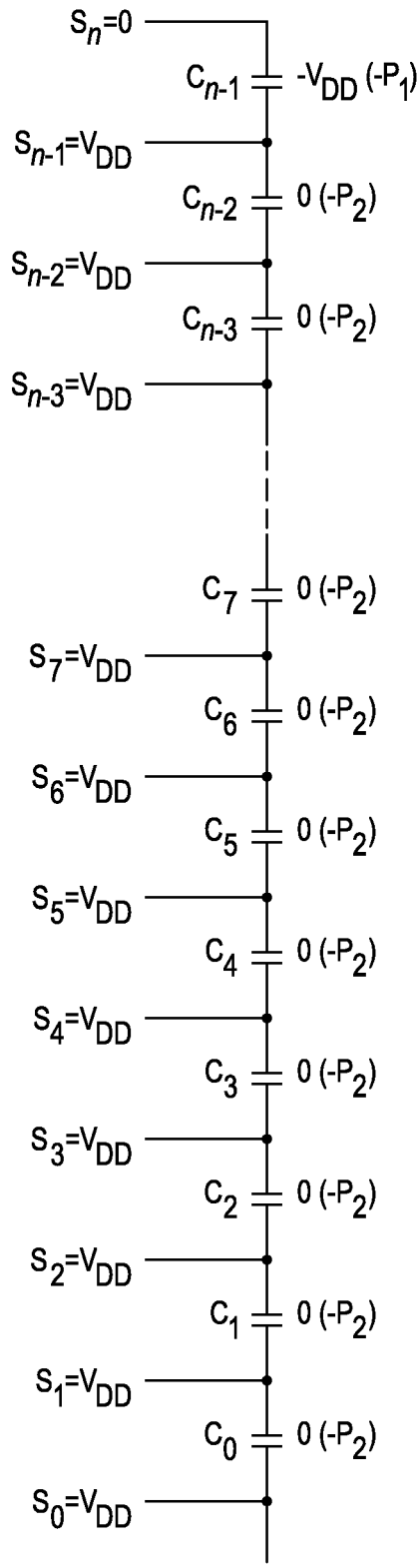
Figure 6D:
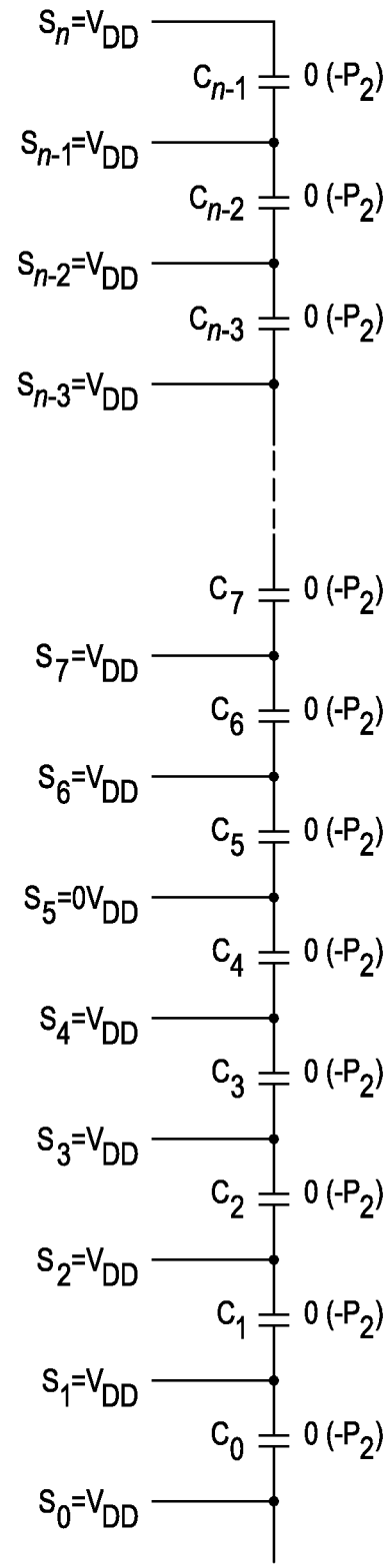

For each successive loop iteration x of method 500, one additional capacitor at a time (e.g., per CLK of INIT FSM 222 of FIG. 2), compared to the immediately preceding iteration x-1, will achieve a polarization of $-P_1$, with each capacitor below that additional capacitor having achieved a polarization of $-P_2$. FIG. 6C, by way of example, therefore illustrates the loop iteration for x=n-1, in which case all poling signals in a first subset from $S_0$ to $S_{n-1}$ equal $V_{DD}$, while the remaining poling signal in the second subset, namely $S_n$, equals 0. Thus, following those n-1 loop iterations, all capacitors $C_0$ through $C_{n-2}$ will be polarized to $-P_2$, while capacitor $C_{n-1}$ will be polarized to $-P_1$. Further, for the iteration of x=n-1, then operation 506 is still satisfied, so operation 508 is repeated one more time to increment x=n and step 504 is repeated, with the result being that illustrated in FIG. 6D. Specifically, in this final loop iteration of method 500, wherein x=n, then all poling signals in a first subset from $S_0$ to $S_n$ equal $V_{DD}$, while the remaining subset is the null set, as there are no additional poling signals having an index greater than n. Further, therefore, in this iteration for x=n, $S_n=V_{DD}$, whereas in the immediately preceding iteration of x=n-1 then $S_n=0$, so whereas capacitor $C_{n-1}$ was polarized to $-P_1$ for the iteration of x=n-1 in response to a voltage across it of $-V_{DD}$, when x=n then the voltage of $S_n=S_{n-1}=V_{DD}$ increases the voltage across capacitor $C_{n-1}$ from $-V_{DD}$ to zero, thereby causing it to polarize, as indicated by the response curve in FIG. 7, to a polarization of $-P_2$. Thus, for x=n, capacitor $C_{n-1}$ remains negatively polarized, and is now polarized in a same direction and same magnitude as all other capacitors in stack 232, 234.

As described above, method 500 commences with 0 volts across each capacitor in the capacitor stack, and then from a direction in ascending index x for capacitor $C_x$ in the capacitors $C_0$ up to $C_{n-1}$, then one capacitor a time and for that index is biased to a first polarity having a first magnitude and a first direction, and then in a successive ascension of the index to x+1 that same capacitor is further biased to maintain that same first polarity direction, albeit changing, potentially, by some difference in magnitude. Given that the sequence of such changing biases may be perceived as from the bottom of the stack (i.e., as to capacitor $C_0$, closest to VREF), in an upward direction in the schematic sense of stack 30 (i.e., toward capacitor $C_{n-1}$, the top electrode of which is the stack output $v_{out}$), then the process may be perceived as akin to an upward zipper of values, where each ascendant step of the zipper is the new application of $V_{DD}$ to a next selected capacitor upper electrode in the serial chain, thereby moving that capacitor to a negative polarity while ensuring the capacitor(s) below the selected capacitor also maintain(s) a likewise, and earlier established, negative polarity. Accordingly, as the figurative zipper moves up, the magnitude of the polarization across each capacitor may recede, but it will not change state (i.e., from negative to positive or vice versa) by virtue of the sequencing of the preferred embodiment. As a result, upon completion of method 500, all capacitors in the stack have co-aligned directionality of polarization.

Figure 8:
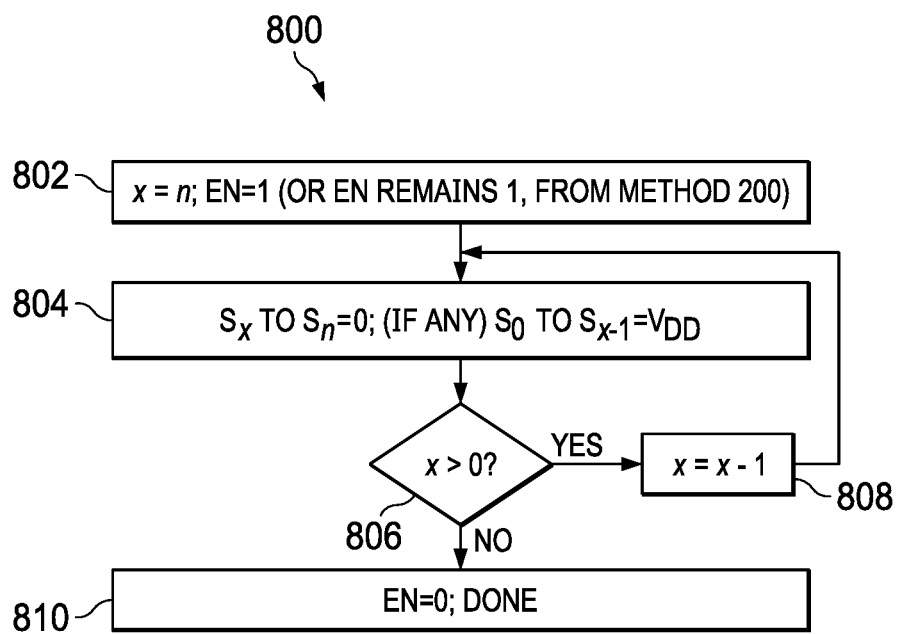
FIG. 8 shows an example of another portion of a method for poling the acceleration sensor.

Having described a bottom-upward, negative polarization technique for capacitor stack 232, 234, an embodiment also includes a defined sequence to prevent random events, such as the possibility of a change in polarity direction, while removing the non-zero biases applied by poling signals $S_0$ through $S_n$ to the capacitor stack. In this regard, FIG. 8 illustrates an example method 800 that may be used in sequentially removing the non-zero poling signals in a controlled and defined manner, so as to reduce or eliminate issues that may arise from otherwise uncontrolled discharge events.

Method 800 commences at 802, in which the loop index x is initialized to n, that is, the number of the topmost poling signal $S_n$, again to facilitate a sequential looping through a total of n+1 iterations for the n+1 poling signals, but here in a decrementing fashion so as to sequence from the top of capacitor stack 232, 234 downward. Meanwhile, again for operation 802 (as was the case for method 500 of FIG. 5), EN=1, thereby closing all of the low leakage switches $LLS_0$ through $LLS_n$, so that poling signals $S_0$ through $S_n$ are connected to respective nodes in the capacitor stack (and $\overline{EN}=0$ keeps switches $S_{US}$ and $S_{LS}$ open).

Figure 9A:
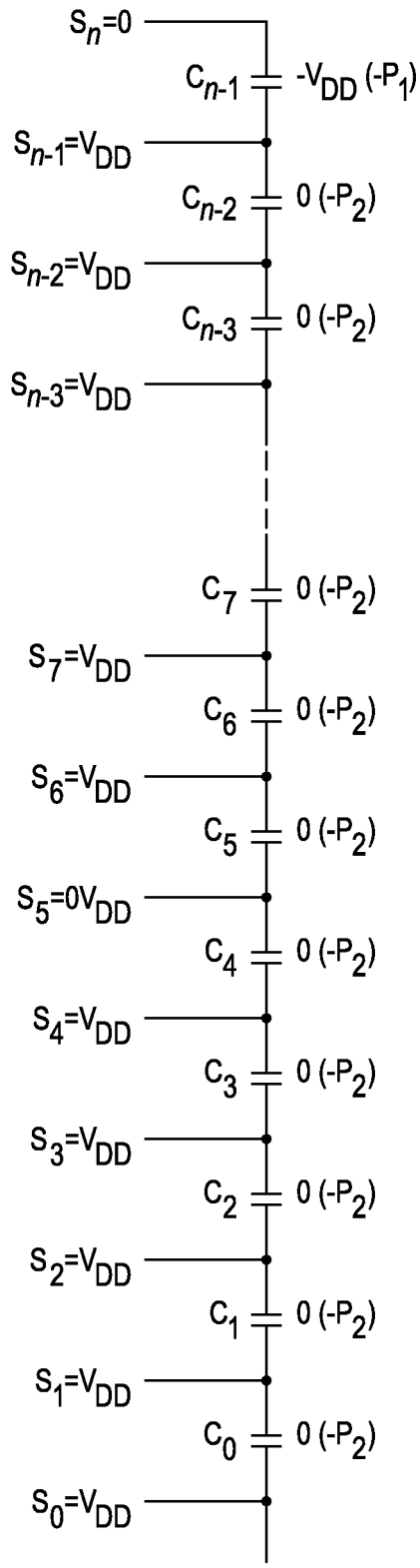
FIGS. 9A-9D illustrate a time sequence of poling actions corresponding to FIG. 8.

At 804, a first subset of the poling signals $S_0$ through $S_n$, namely, $S_0$ to $S_{x-1}$, are set to $V_{DD}$ (or maintained at $V_{DD}$ from method 500) while a second subset of the poling signals $S_x$ through $S_n$, being the remaining poling signals not included in the first subset and, therefore, $S_x$ to $S_n$, are set to ground (shown as zero volts). By way of example, therefore, for the first iteration of 804 (i.e., x=n from step 802), then the first subset of signals has $S_0$ through $S_{n-1}$ equal to $V_{DD}$, while the second subset and remaining poling signal $S_n$ equals 0. To further illustrate this example, FIG. 9A again illustrates the simplified and partial view of the capacitor stack as used in FIGS. 6A through 6D, but here with the application of poling signals from method 800. Thus, in FIG. 9A, with $S_n=0$ and $S_{n-1}=V_{DD}$, the voltage across capacitor $C_{n-1}$ is $-V_{DD}$, as shown to the right of the capacitor in FIG. 9A. At the same time, however, with the remaining $S_0$ to $S_{x-1}$ equal to $V_{DD}$, then each of the other capacitors $C_0, \ldots, C_{n-2}$ has a voltage of 0 volts across it, as also shown to the right of each of those capacitors. Additionally, in FIG. 9A, to the right of the voltage across each capacitor is again shown a parenthetical with the resultant polarization. Accordingly, from the first instance of operation 804, the voltage of $-V_{DD}$ across capacitor $C_{n-1}$ results in a ferroelectric material polarization of $-P_1$. For the remaining capacitors $C_0, \ldots C_{n-2}$, that is, that the capacitors below capacitor $C_{n-1}$ in the capacitor stack, those capacitors will have been formerly polarized to $-P_2$ by the earlier application of method 500 and therefore the parenthetical indication of "$-P_2$" is shown in FIG. 9A (and later figures, where applicable).

Method 800 continues to at operation 506, which compares the loop index x to see if it has reached zero, that is, in effect determining whether the bottommost poling signals $S_n$ has been processed in the loop. If the loop index x is greater than zero, then method 800 proceeds to operation 808 which decrements the loop index x and returns flow to step 804, whereas if the loop index x reaches (i.e., is equal to) zero, then method 800 proceeds to operation 810 in which EN is set to zero so as to complete the method and whereby its complement thereby closes switches $S_{US}$ and $S_{LS}$.

Figure 9B:
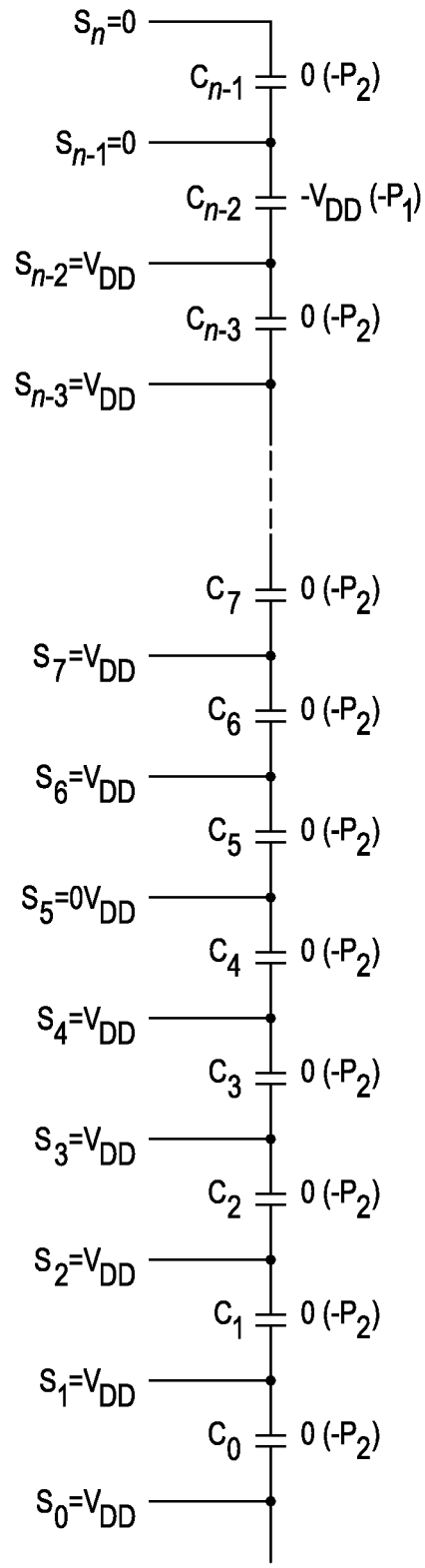
Figure 9C:
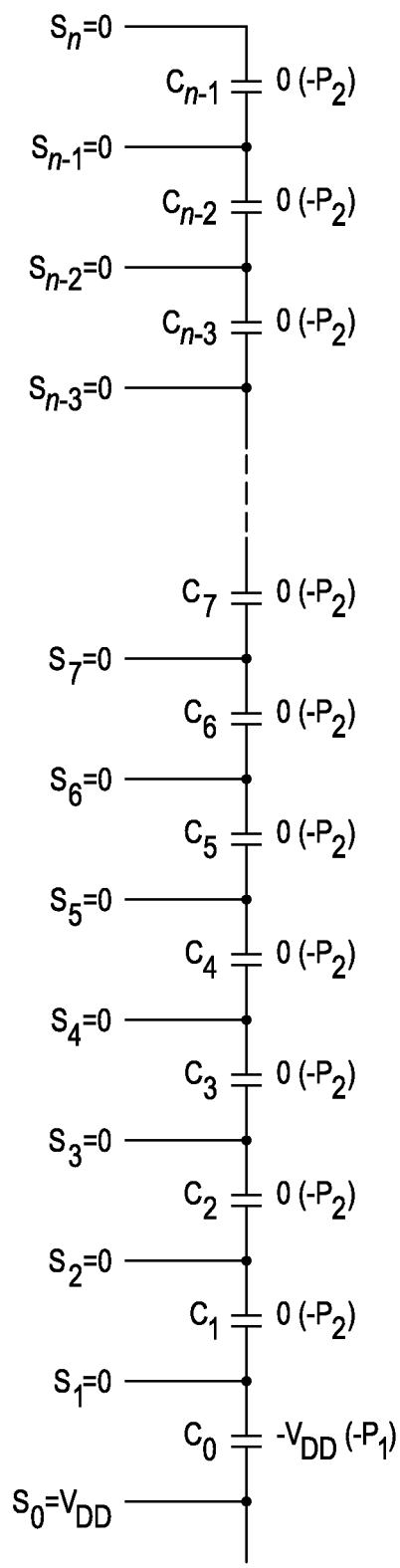
Figure 9D:
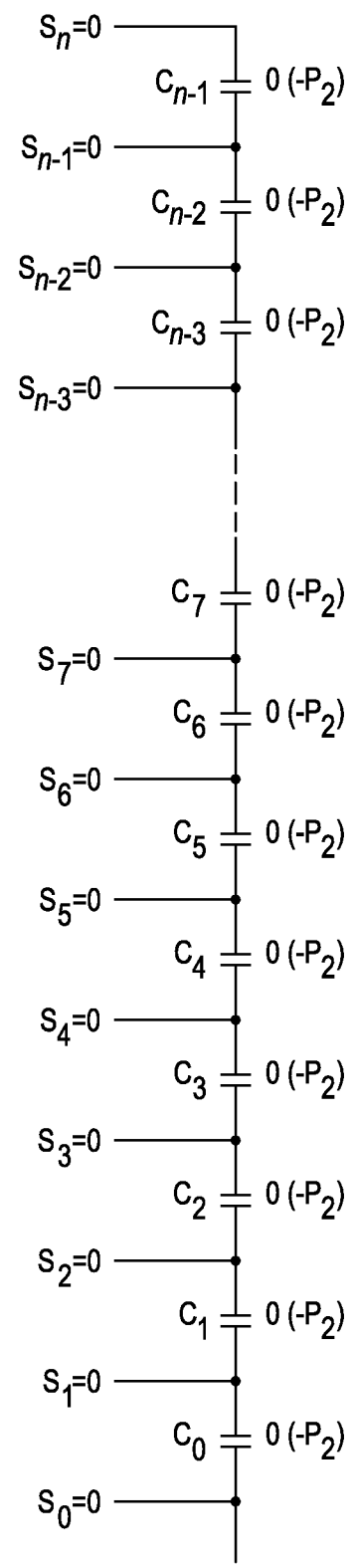

For each decrease in loop index x, then from the top of the capacitor stack downward, each successive capacitor $C_x$ will receive a voltage of 0 at its upper electrode, with a voltage of $V_{DD}$ at its lower electrode, thereby causing the capacitor, in response to those respective voltages, and the $-V_{DD}$ difference between them, to achieve a polarization of $-P_1$. FIG. 9B illustrates the biasing signals and polarization of the capacitor stack when the method 800 loop index x equals n−1. Thus, $S_{n-1}$ equals 0 at the upper electrode of capacitor $C_{n-2}$, while $S_{x-1}$ (i.e., $S_{(n-1)-1}=S_{n-2}$) equals $V_{DD}$ at the bottom electrode of capacitor $C_{n-2}$, polarizing the capacitor at $-P_1$. Note, however, the effect of the loop on the capacitor above capacitor $C_{n-2}$, that is, at capacitor $C_{n-1}$. For that capacitor, both its upper and lower electrodes are now at 0 volts, so the voltage across the capacitor, formerly at $-V_{DD}$ for the immediately preceding iteration of x=n, is now switched to 0 volts. Hence, per FIG. 7, the polarity direction of the capacitor does not change, while the polarization magnitude of the capacitor changes from $-P_1$ to $-P_2$. FIG. 9C illustrates the biasing signals and polarization of the capacitor stack when the method 800 loop index x equals 1, and FIG. 9D illustrates the biasing signals and polarization of the capacitor stack when the method 800 loop index x equals 0. By the last step as illustrated in FIG. 9D, each capacitor, formerly having a polarization of $-P_1$ for one cycle wherein there is $-V_{DD}$ across it, has for a next loop then had 0 volts applied across both its upper and lower electrodes, thereby changing the polarization from $-P_1$ to $-P_2$, in an orderly, sequential and controlled fashion, so as to discharge the signal applied to the device while ensuring the polarization remains negative and, therefore, does not switch state to a positive polarization.

From the above, method 500 essentially achieves a uniform negative polarization of $-P_2$ across each capacitor in the capacitor stack 232, 234 (see FIG. 6D), by sequentially polarizing each successive capacitor in a first direction (e.g., bottom upward) across the capacitor stack, and method 800 controllably preserves that negative polarization of $-P_2$ across each capacitor in the capacitor stack (see FIG. 9D), by sequentially discharging both capacitor electrodes to ground for each successive capacitor in a second direction (e.g., top downward), opposite the first direction.

Figure 10:
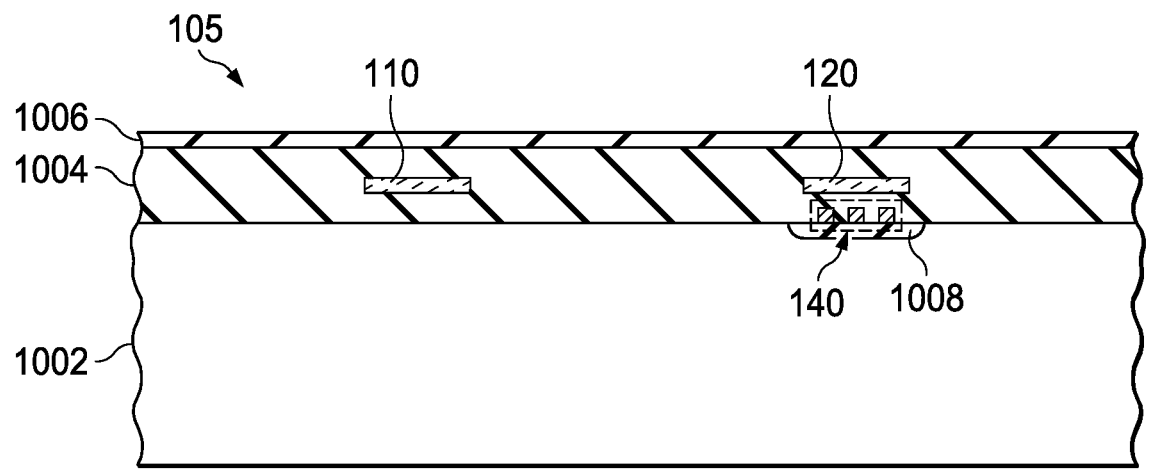
FIG. 10 shows an example of the location of a heater relatively to a pyroelectric sensor ("pyro").

The location of the heater 140 is such that the pyroelectric sensor is heated with a known and uniform temperature. The heater 140 is thermally-coupled to the pyro 120. FIG. 10 shows an example of the semiconductor die 105 including a silicon substrate 1002, a dielectric layer (e.g., silicon dioxide, silicon nitride, etc.) 1004 formed on the silicon substrate 1002, and a protective overcoat (PO) layer (e.g., silicon nitride, silicon oxynitride) 1006. PO layer 1006 may be exposed to air or a package material (e.g., plastic). The piezo 110 and pyro 120 are formed in the dielectric layer 1004. The heater 140 is formed between the pyro 120 and the silicon substrate 1002 where most of the heat is lost. In this example, the piezo 110 and pyro 120 are separated. The heater 140 is near the pyro 120, and between the pyro 120 and the silicon substrate 1002. Because the thermal conductivity of silicon is much higher than the other materials, heat will always flow into the silicon substrate 1002. Therefore, the heater 140 formed below the pyro 120 (i.e., between the pyro 120 and the silicon substrate 1002) creates a relatively uniform temperature above the heater 140 where the pyro 120 is located. The heat loss from the heater 140 is dominated by the silicon substrate 1002 and therefore the temperature above the heater 140 away from the silicon substrate is uniform and this region includes the pyro 120.

FIG. 10 also illustrates a thin layer 1008 separating the heater 140 from the silicon substrate 1002. Thin layer 1008 comprises a relatively low thermal conductivity dielectric (e.g., silicon dioxide and/or silicon nitride). The thinner is layer 1008, the higher the power is necessary to raise the temperature of the pyro 120.

Figure 11:
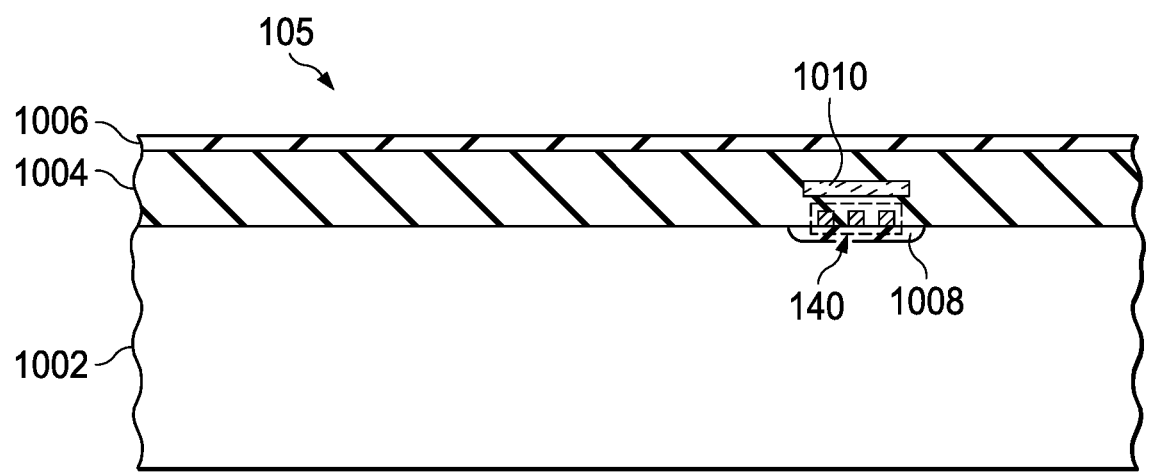
FIG. 11 shows an example in which the functionality of the pyro and of a piezoelectric sensor ("piezo") are combined in one sensor near the heater.

The example of FIG. 11 is similar to the example of FIG. 10. The example of FIG. 11 also includes the silicon substrate 1002, the dielectric layer 1004, and the PO layer 1006. The functionality of the piezo 110 and pyro 120 are combined into one sensor 1010 in FIG. 11. The advantage of this approach is that analog circuitry can be shared. For example, a single amplifier (rather than two as shown in FIG. 1) can be used in the example of FIG. 11.

Figure 12:
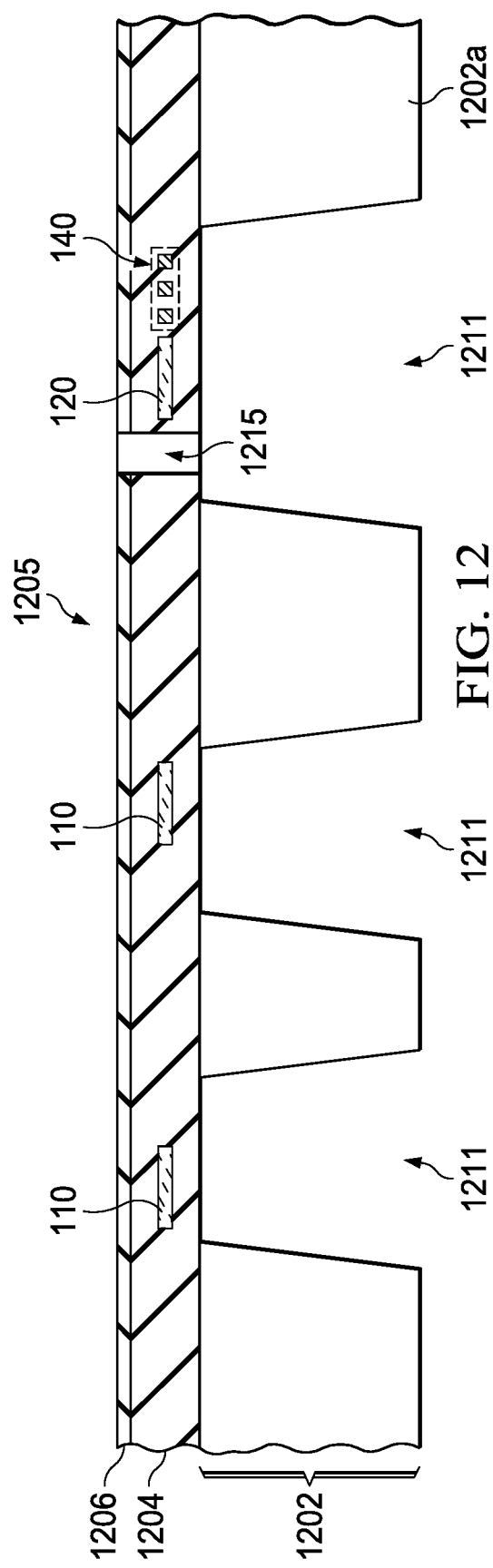
FIG. 12 shows an example of microelectromechanical system (MEMS) structure including a heater near a pyro.

FIG. 12 shows an example of a microelectromechanical system (MEMS) structure 1205. The example MEMS structure 1205 includes a silicon layer 1204, a dielectric layer 1204 (e.g., silicon dioxide, silicon nitride, etc.), and a PO layer 1206 (e.g., silicon nitride, silicon oxynitride). The silicon layer 1204 has been etched (or otherwise processed) to form cavities 1211 therein. The dielectric layer 1204 also is etched as shown at 1215. One or more piezo 110 are formed on one side of the etched region 1215, and the pyro 120 is formed on the other side as shown. The heater 140 is formed between the pyro 120 and the portion 1202a of the silicon layer 1200 (on the pyro 120 side of the etched region 1215). The temperature beyond the heater 140 (toward the pyro 120) will advantageously be relatively uniform.

Figure 13:
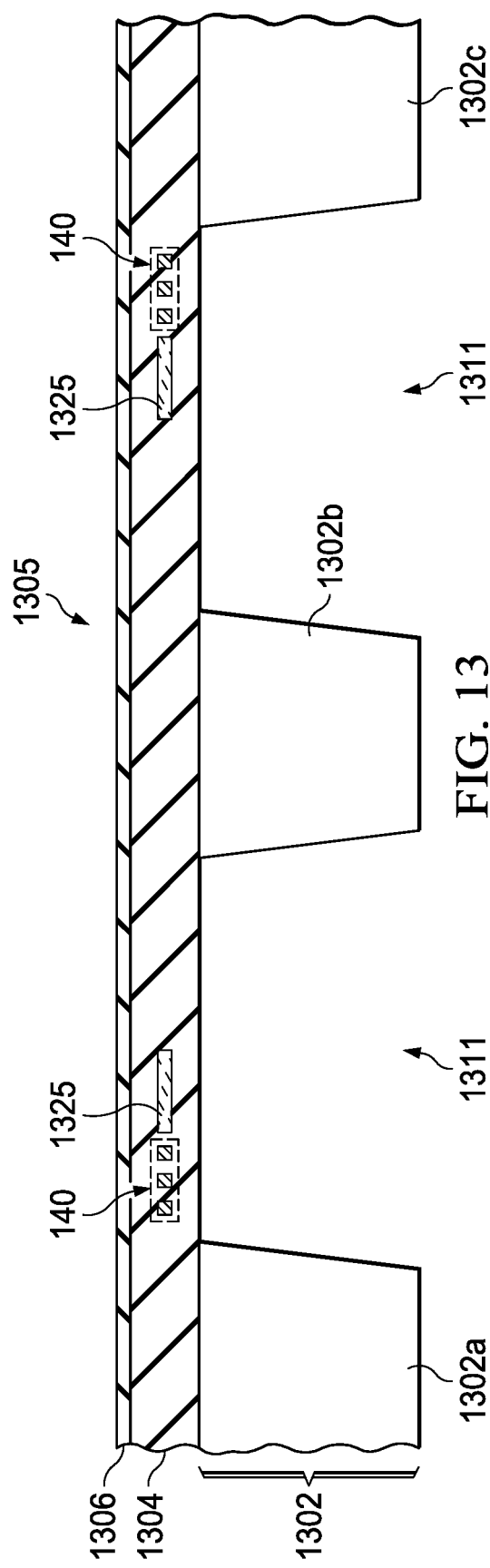
FIG. 13. Shows an example of a MEMS structure in which heaters are near sensors that combine the functionality of the pyro and piezo.

FIG. 13 shows another example of a MEMS structure 1305. The example MEMS structure 1305 includes a silicon layer 1304, a dielectric layer 1304 (e.g., silicon dioxide, silicon nitride, etc.), and a PO layer 1206 (e.g., silicon nitride, silicon oxynitride). The silicon layer 1304 has been etched (or otherwise processed) to thereby create substrate portions 1302a, 1302b, and 1302c with cavities 1311 therebetween. One or more piezo/pyro-combined sensors 1325 are formed within the dielectric layer 1304. The heater 140 for each sensor is between the respective sensor 1325 and the respective outer substrate portion 1302a or 1302c as shown. The center substrate portion 1302b is not connected to either substrate portions 1302a or 1302c. Center substrate portion 1302b functions as a thermal mass and not a thermal sink. In steady state operation, the temperature between the heaters 140 will be relatively constant which includes the two sensors 1325. The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A semiconductor die, comprising:
   a piezoelectric device;
   a pyroelectric device;
   a heater thermally coupled to the pyroelectric device; and
   a finite state machine (FSM) coupled to the piezoelectric device, to the pyroelectric device, and to the heater.

2. The semiconductor die of claim 1, wherein the FSM is configured to pole the piezoelectric device and to pole the pyroelectric device.

3. The semiconductor die of claim 1, wherein the FSM is configured to turn on the heater during a calibration process.

4. The semiconductor die of claim 1, further comprising processing logic coupled to the piezoelectric device and the pyroelectric device, the processing logic configured to:
   measure a signal from the pyroelectric device; and
   normalize the signal from the pyroelectric device.

5. The semiconductor die of claim 1, further comprising a temperature sensor configured to measure a temperature of at least one of the heater or the pyroelectric device.

6. The semiconductor die of claim 5, further comprising processing logic coupled to the piezoelectric device and the pyroelectric device,
   wherein the FSM is configured to turn on the heater; and
   wherein the processing logic is configured to:
      determine a temperature from the temperature sensor;
      normalize a signal from the pyroelectric device to produce a normalized pyroelectric signal; and
      determine a scaling factor from the normalized pyroelectric signal for the determined temperature.

7. The semiconductor die of claim 6, further comprising a storage, wherein the processing logic is configured to:
   write the scaling factor into the storage; and
   read, from the storage, the scaling factor to combine with an output of the piezoelectric device.

8. The semiconductor die of claim 1, wherein the piezoelectric device is configured to operate as an acceleration sensor.

9. The semiconductor die of claim 1, further including:
   a first amplifier coupled to the piezoelectric device; and
   a second amplifier coupled to the pyroelectric device.

10. The semiconductor die of claim 1, wherein the FSM is configured to operate the heater and the pyroelectric device to determine a scaling factor to combine with an output of the piezoelectric device to generate a measurement.

11. The semiconductor die of claim 9, wherein the piezoelectric device is a first piezoelectric device, the pyroelectric device is a first pyroelectric device, and the semiconductor die further comprises:
   a first reference capacitor coupled to the first amplifier;
   a second reference capacitor coupled to the second amplifier;
   a set of piezoelectric devices including the first piezoelectric device; and
   a set of pyroelectric devices including the first pyroelectric device,
   the piezoelectric devices including respective piezo capacitors, an electrode of one of the piezo capacitors coupled to the first amplifier, and the first amplifier configured to provide a first signal based on a ratio between a capacitance of the first reference capacitor and a total capacitance of the piezo capacitors; and
   the pyroelectric devices including respective pyro capacitors, an electrode of one of the pyro capacitors coupled to the second amplifier, and the second amplifier configured to provide a second signal based on a ratio between the capacitance of the second reference capacitor and a total capacitance of the pyro capacitors.

12. The semiconductor die of claim 11, further comprising:
   a first reset switch coupled between an input and an output of the first amplifier; and
   a second reset switch coupled between an input and an output of the second amplifier,
   the first reset switch configured to set a direct current (DC) bias point of the first amplifier by closing before the first amplifier provides the first signal; and
   the second reset switch configured to set the DC bias point of the second amplifier by closing before the second amplifier provides the second signal.

13. The semiconductor die of claim 11, wherein:
   the piezo capacitors are connected in series;
   the pyro capacitors are connected in series;
   the semiconductor die further comprises first switches, second switches, first poling signal sources, and second poling signal sources;
   each first poling signal source is coupled via a respective one of the first switches to a respective one of the piezo capacitors;
   each second poling signal source is coupled via a respective one of the second switches to a respective one of the pyro capacitors; and
   the first switches and the second switches are coupled to the FSM.

14. The semiconductor die of claim 13, wherein the FSM is configured to control the first switches to successively connect the first poling signal sources to their respectively coupled piezo capacitors in a particular sequence, in which each piezo capacitor has a first negative ferroelectric polarization magnitude when all of the first poling signal sources are connected to their respectively coupled piezo capacitors.

15. The semiconductor die of claim 14, wherein the particular sequence is a first sequence; and wherein the FSM is configured to control the first switches to successively disconnect the first poling signal sources from their respectively coupled piezo capacitors in a second sequence reversed from the first sequence, in which each piezo capacitor has a second negative ferroelectric polarization magnitude when all of the first poling signal sources are disconnected from their respectively coupled piezo capacitors.

16. The semiconductor die of claim 13, wherein the FSM is configured to control the second switches to successively connect the second poling signal sources to their respectively coupled pyro capacitors in a particular sequence, in which each pyro capacitor has a first negative ferroelectric polarization magnitude when all of the second poling signal sources are connected to their respectively coupled piezo capacitors.

17. The semiconductor die of claim 16, wherein the particular sequence is a first sequence; and wherein the FSM is configured to control the second switches to successively disconnect the second poling signal sources from their respectively coupled pyro capacitors in a second sequence reversed from the first sequence, in which each pyro capacitor has a second negative ferroelectric polarization magnitude when all of the second poling signal sources are disconnected from their respectively coupled pyro capacitors.

18. The semiconductor die of claim 1, wherein the piezoelectric device and the pyroelectric device comprise a same type of piezoelectric material.

19. The semiconductor die of claim 1, wherein the heater comprises a pyro resistor heater.

\* \* \* \* \*